(12) United States Patent
Darbonville et al.

(10) Patent No.: US 11,345,486 B2
(45) Date of Patent: May 31, 2022

(54) TRANSPORT AND REFERENCING CARRIAGE FOR WINGS OF AN AIRCRAFT

(71) Applicants: Airbus SAS, Blagnac (FR); Airbus Operations SAS, Toulouse (FR)

(72) Inventors: Nicolas Darbonville, Toulouse (FR); Jean-Marc Datas, Toulouse (FR); Jacques Bouriquet, Colomiers (FR); Jean-Mickael Brindeau, Blagnac (FR); Patrick Guibert, Plaisance du Touch (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 247 days.

(21) Appl. No.: 16/699,898

(22) Filed: Dec. 2, 2019

(65) Prior Publication Data
US 2020/0172267 A1    Jun. 4, 2020

(30) Foreign Application Priority Data

Dec. 4, 2018 (FR) ...................................... 1872303

(51) Int. Cl.
*B64F 5/00*    (2017.01)
*B64F 5/50*    (2017.01)
*B64F 5/10*    (2017.01)

(52) U.S. Cl.
CPC ................. *B64F 5/50* (2017.01); *B64F 5/00* (2013.01); *B64F 5/10* (2017.01); *B23P 2700/01* (2013.01)

(58) Field of Classification Search
CPC .. B64F 5/50; B64F 5/10; B66F 7/0633; B66F 7/0625; B23P 19/10; B23P 2700/01; B64C 1/26; B64C 3/00
See application file for complete search history.

(56) References Cited

U.S. PATENT DOCUMENTS

| | | | | |
|---|---|---|---|---|
| 2,725,241 A | * | 11/1955 | Leonard, Jr. | B64F 5/50 410/44 |
| 4,440,265 A | * | 4/1984 | Spagnoli | B66F 7/04 182/129 |

(Continued)

FOREIGN PATENT DOCUMENTS

| | | |
|---|---|---|
| EP | 2368799 A1 | 9/2011 |
| FR | 2948099 A1 | 1/2011 |
| GB | 2473100 A | 3/2011 |

OTHER PUBLICATIONS

French Search Report; priority document.

*Primary Examiner* — Lawrence Averick
(74) *Attorney, Agent, or Firm* — Greer, Burns & Crain, Ltd.

(57) ABSTRACT

A transport carriage for wings that are secured together, wherein the transport carriage comprises a chassis mounted on wheels, cradles mounted on positioning cylinders, support cylinders that each have a support mounted on the stem of the support cylinder, a central support having a frame and, for each wing, a rotatable lateral cradle, wherein the frame is movable vertically, for each wing, a lifting system with a mast and an arm, wherein each arm is movable vertically on the mast between a low position and a high position, and for each arm, at least two bearing points for the wing. The use of different movable elements allows good loading of the wings and makes it easier to move the wings thus loaded.

9 Claims, 3 Drawing Sheets

(56) References Cited

U.S. PATENT DOCUMENTS

| | | | | |
|---|---|---|---|---|
| 7,175,168 B2* | 2/2007 | Hardaker | ............. | B64F 5/50 |
| | | | | 244/1 R |
| 8,439,337 B2* | 5/2013 | Kott | ............. | B64F 5/10 |
| | | | | 269/5 |
| 8,539,658 B2* | 9/2013 | Munk | ............. | B64F 5/10 |
| | | | | 29/281.1 |
| 8,602,713 B1* | 12/2013 | Davis | ............. | B60P 1/34 |
| | | | | 414/589 |
| 10,442,555 B2* | 10/2019 | DesJardien | ............. | B64F 5/10 |
| 2006/0266885 A1* | 11/2006 | Hardaker | ............. | B64F 5/50 |
| | | | | 244/119 |
| 2008/0205763 A1 | 8/2008 | Marsh et al. | | |
| 2010/0264573 A1* | 10/2010 | Kott | ............. | B64F 5/50 |
| | | | | 269/55 |
| 2011/0054694 A1* | 3/2011 | Munk | ............. | B64F 5/10 |
| | | | | 700/275 |
| 2011/0147521 A1 | 6/2011 | Delahaye et al. | | |
| 2012/0110816 A1* | 5/2012 | Groves | ............. | B66F 7/28 |
| | | | | 29/428 |
| 2017/0210489 A1* | 7/2017 | Bode | ............. | G05B 19/402 |
| 2018/0354654 A1* | 12/2018 | DesJardien | ............. | B64F 5/10 |
| 2020/0101571 A1* | 4/2020 | Datas | ............. | B66F 7/28 |

* cited by examiner

TRANSPORT AND REFERENCING CARRIAGE FOR WINGS OF AN AIRCRAFT

CROSS-REFERENCES TO RELATED APPLICATIONS

This application claims the benefit of the French patent application No. 1872303 filed on Dec. 4, 2018, the entire disclosures of which are incorporated herein by way of reference.

FIELD OF THE INVENTION

The present invention relates to a transport carriage for wings of an aircraft.

BACKGROUND OF THE INVENTION

In the context of the fitting of the wings on an aircraft, the wing is transported from its storage location to its fitting location with the aid of carriages. Once it is at the fitting location, the wing is transferred toward a bridge crane for moving the wing to its position for fastening to the fuselage.

Although such carriages are entirely satisfactory, they take up a relatively large amount of space and are difficult to maneuver, and it is also necessary to provide bridge cranes for access.

SUMMARY OF THE INVENTION

An object of the present invention is to propose a transport carriage for wings of an aircraft, which makes it possible, inter alia, to do away with a bridge crane and which makes it possible to improve the production rate by also effecting the placement of the wings on the structure of the aircraft.

To this end, the invention proposes a transport carriage for wings of an aircraft, having a structure where the wings are secured together, the transport carriage having a vertical median plane and comprising:
- a chassis mounted on pivotable wheels,
- a front cradle and a rear cradle that are intended to come to bear under the structure of the aircraft,
- for each cradle, a positioning cylinder, wherein the cradle is mounted on the stem of the positioning cylinder, wherein each cradle is positioned in a centered manner with respect to the median plane,
- two front support cylinders and two rear support cylinders, each of which has a support that is mounted on the stem of the support cylinder and is intended to come to bear under the structure of the aircraft, wherein the two front support cylinders are positioned on either side of the median plane and the two rear support cylinders are positioned on either side of the median plane,
- a central support having a frame and, for each wing, a lateral cradle intended to come to bear under the wing, wherein each lateral cradle is mounted on the frame so as to be freely rotatable about a third axis of rotation perpendicular to the median plane, wherein the frame is mounted so as to be vertically movable with respect to the chassis between a retracted position and a lifted position,
- a third actuator that moves the frame from the retracted position to the lifted position and vice versa,
- for each wing, a lifting system that comprises a mast and an arm, wherein the two arms are positioned on either side of the median plane, wherein each arm is movable vertically in translation on the mast between a low position and a high position,
- for each arm, a fifth actuator that moves the arm from the low position to the high position and vice versa,
- for each arm, at least two bearing points, each of which is intended to come to bear under the corresponding wing during the movement of the arm to the high position, and
- a control unit that controls each positioning cylinder, each support cylinder, the third actuator, and the fifth actuator.

The use of different movable elements allows good loading of the wings and makes it easier to move the wings thus loaded.

Advantageously, the transport carriage comprises pressure sensors between each cradle and the structure, for the one part, and each support and the structure, for the other part, and the control unit adjusts the movement of each positioning cylinder and of each support cylinder on the basis of data collected by the pressure sensors.

Advantageously, each positioning cylinder is mounted on the chassis so as to be rotatable about a first axis of rotation and so as to be movable between a lying position and a raised position, wherein, in the raised position, each cradle is positioned in a centered manner with respect to the median plane, and, for each positioning cylinder, the transport carriage comprises a first actuator that is controlled by the control unit and moves the positioning cylinder from the lying position to the raised position and vice versa.

Advantageously, each support cylinder is mounted on the chassis so as to be rotatable about a second axis of rotation and is movable between a lying position and a raised position, wherein, in the raised position, the two front support cylinders are positioned on either side of the median plane and the two rear support cylinders are positioned on either side of the median plane, and, for each support cylinder, the transport carriage comprises a second actuator that is controlled by the control unit and moves the support cylinder from the lying position to the raised position and vice versa.

Advantageously, each mast is mounted on the chassis so as to be rotatable about a fourth axis of rotation between a lying position and a raised position, wherein, in the raised position, the two arms are positioned on either side of the median plane, wherein, when the mast is in the raised position, each arm is movable vertically in translation on the mast between the low position and the high position, and, for each mast, the transport carriage comprises a fourth actuator that is controlled by the control unit and moves the mast from the lying position to the raised position and vice versa.

Advantageously, each bearing point is mounted on the arm via a third compound sliding table, which allows, in the high position, the bearing point to be moved in two orthogonal and horizontal directions.

Advantageously, each third compound sliding table is mounted on the stem of a lifting cylinder that is fastened to the arm and controlled by the control unit.

Advantageously, each cradle is mounted on the stem of the positioning cylinder via a first compound sliding table, which allows the cradle to be moved in two orthogonal and horizontal directions.

Advantageously, the support is mounted on the stem of the support cylinder via a second compound sliding table, which allows the support to be moved in two orthogonal and horizontal directions.

Advantageously, the central support has an additional frame, which is shared by the two lateral cradles and which is mounted on the frame so as to be rotatable about the third axis of rotation, and each lateral cradle is mounted on the additional frame so as to be rotatable.

BRIEF DESCRIPTION OF THE DRAWINGS

The abovementioned features of the invention, and others, will become more clearly apparent from reading the following description of an exemplary embodiment, this description being given with reference to the appended drawings, in which.

DETAILED DESCRIPTION OF THE PREFERRED EMBODIMENTS

Figure 1:
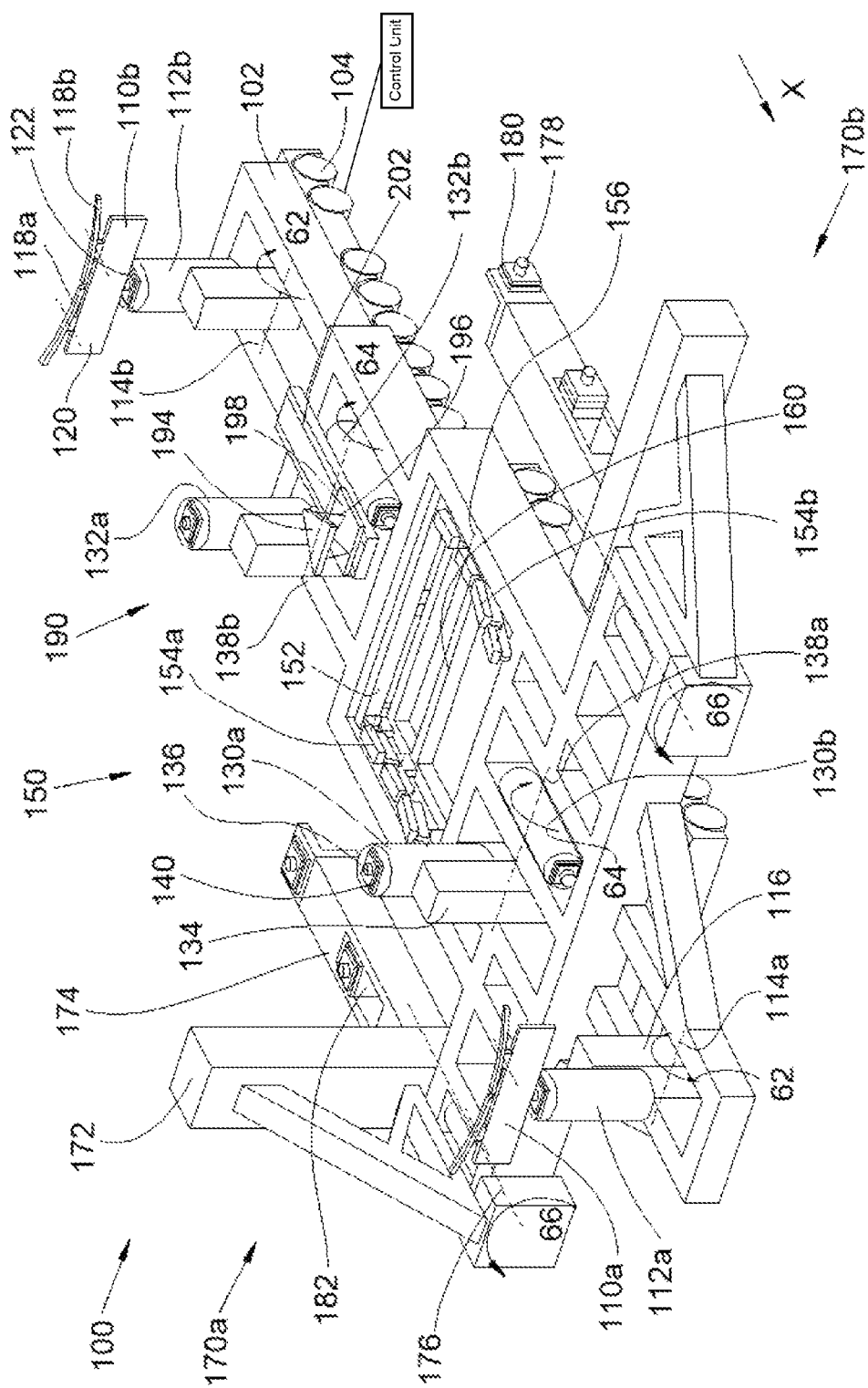
FIG. 1 is a perspective view of a transport carriage for the wings of an aircraft according to the invention.

In the following description, terms relating to a position are with reference to a transport carriage for wings of an aircraft, that is to say, as shown in FIG. 1. The wings of the aircraft are wings that are secured together in the central part and which will be fastened to the structure of the aircraft from beneath the structure.

FIG. 1 shows a transport carriage 100 for transporting wings of an aircraft and for positioning them under the structure of the aircraft, that is to say, at the location where they are intended to be fastened.

Figure 2:
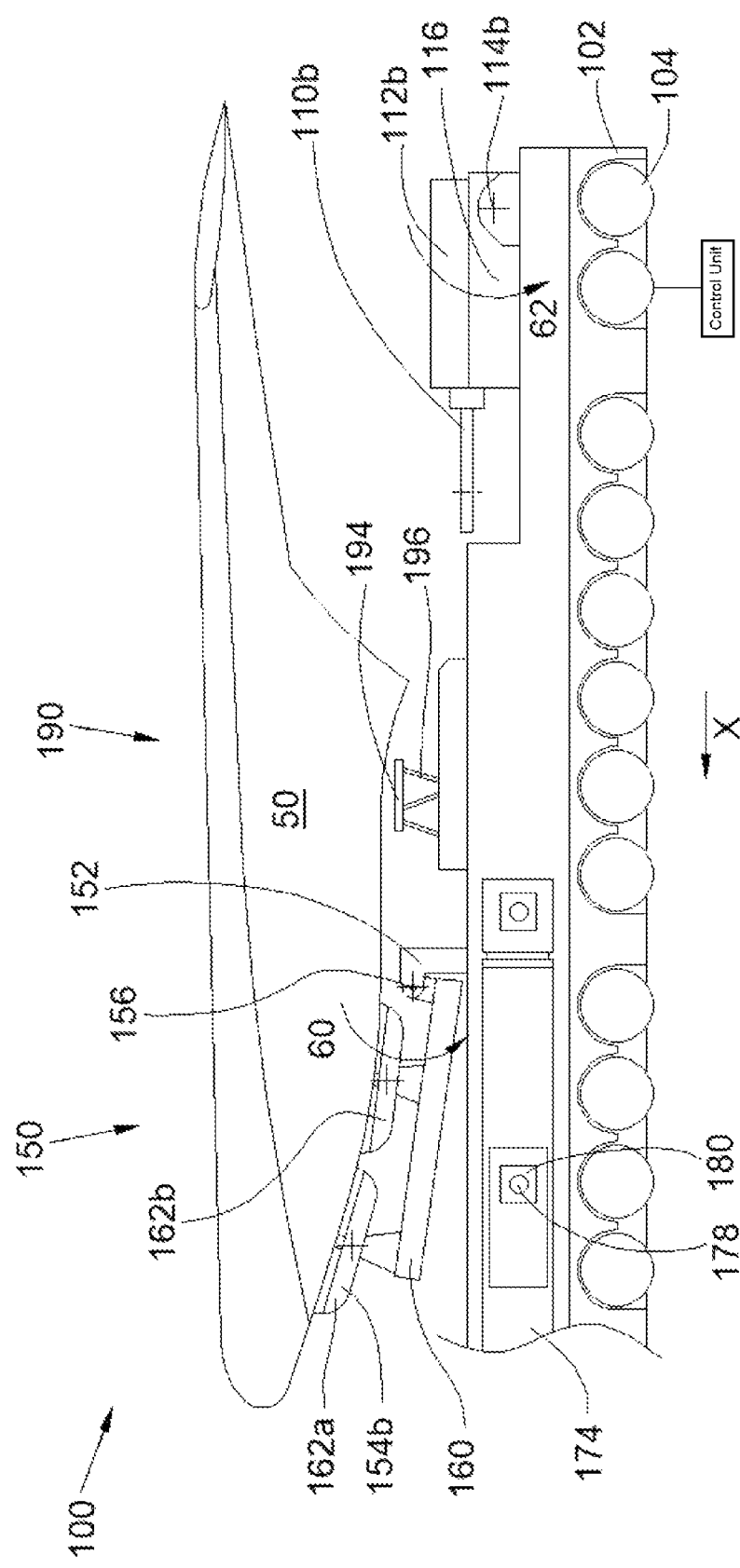
FIG. 2 is a partial side view of the carriage in FIG. 1 transporting a wing.

FIG. 2 shows the transport carriage 100 carrying the wings 50.

Each wing 50 conventionally has a proximal end, which is the end that is intended to be fastened to the fuselage of the aircraft, and a distal end, which is the other end of the wing, that is to say, the free end. The proximal ends of the two wings 50 are fastened together.

The "front" and "rear" positions which are mentioned in the description are defined with respect to the front and rear orientation of the wings 50 resting on the transport carriage 100, that is to say, the front of the transport carriage 100 corresponds to the front of the wings 50 and the rear of the transport carriage 100 corresponds to the rear of the wings 50. In FIG. 1 and FIG. 2, the front is thus at the left and the rear is thus at the right.

The transport carriage 100 has a chassis 102, which is mounted on pivotable wheels 104, at least some of which can be driven by a motor. The transport carriage 100 has a longitudinal axis X, which is the main rolling direction of the wheels 104, and a median plane of vertical symmetry. Alternatively, the transport carriage 100 can be pulled by a tractor. The two wings are joined in the median plane.

The transport carriage 100 has a control unit that controls each driven wheel 104.

The control unit has, connected by a communication bus: a central processing unit (CPU); a random access memory (RAM); a read-only memory (ROM); a storage unit such as a hard drive or storage medium reader, such as an SD ("secure digital") card reader; at least one communications interface, allowing the control unit to communicate with the different components of the transport carriage 100.

The processor is capable of executing instructions loaded in the RAM from the ROM, from an external memory (not shown), from a storage medium (such as an SD card), or from a communications network. When the equipment is powered up, the processor is capable of reading the instructions from the RAM and executing them. These instructions form a computer program that causes the processor to implement all or some of the algorithms and steps allowing the functioning of the handling system 100.

All or some of the algorithms and steps can be implemented in the form of software by the execution of a set of instructions by a programmable machine, for example a digital signal processor (DSP) or a microcontroller, or be implemented in the form of hardware by a machine or dedicated component, for example a field-programmable gate array (FPGA) or an application-specific integrated circuit (ASIC).

The transport carriage 100 has a front cradle 110a and a rear cradle 110b. Each cradle 110a-b is intended to come to bear under the structure of the aircraft. Each cradle 110a-b has a bowed shape about the longitudinal axis X.

Each cradle 110a-b is mounted on the stem of a positioning cylinder 112a-b, which makes it possible to vertically alter the position of the cradle 110a-b, and in order to save space, each positioning cylinder 112a-b is in this case mounted on the chassis 102 so as to be rotatable about a first axis of rotation 114a-b and is thus movable between a lying position (FIG. 2), in which the positioning cylinder 112a-b is horizontal for retraction into the chassis 102, and a raised position (FIG. 1), in which the positioning cylinder 112a-b is vertical.

In the use position, and more particularly here in the raised position, each cradle 110a-b is positioned in a centered manner with respect to the median plane.

The transport carriage 100 has, for each positioning cylinder 112a-b, a first actuator, for example a motor or cylinder, which moves the positioning cylinder 112a-b from the lying position to the raised position and vice versa. The control unit controls each first actuator and each positioning cylinder 112a-b.

In the embodiment of the invention presented in FIG. 1, the first axis of rotation 114a-b is perpendicular to the median plane.

In the embodiment of the invention presented in FIG. 1, each positioning cylinder 112a-b is mounted on a beam 116 and it is this beam 116 that is rotatable on the chassis 102, but according to another embodiment, each positioning cylinder 112a-b could be mounted in a directly rotatable manner on the chassis 102.

Each cradle 110a-b has a plurality of supports 118a-b and a base 120. Each support 118a-b is bowed and is mounted on the base 120 so as to be freely rotatable about a tilting axis parallel to the longitudinal axis X. The base 120 is mounted on the associated positioning cylinder 112a-b.

In order to allow adjustment of each cradle 110a-b with respect to the structure of the aircraft, the cradle 110a-b, and more particularly here the base 120, is mounted on the stem of the positioning cylinder 112a-b via a first compound sliding table 122, which allows, in the raised position, the movement of the cradle 110a-b in two orthogonal and horizontal directions. The first compound sliding table 122 can be driven by a motor and is then controlled by the control unit.

The transport carriage 100 has two front support cylinders 130a-b and two rear support cylinders 132a-b.

Each support cylinder 130a-b, 132a-b has a support 136 that is mounted on the stem of the support cylinder 130a-b, 132a-b and is intended to come to bear under the structure of the aircraft, and the movement of the support cylinder 130a-b, 132a-b makes it possible to alter the position of the support 136 vertically. In order to save space, each support cylinder 130a-b, 132a-b is in this case mounted on the chassis 102 so as to be rotatable about a second axis of rotation 138*a-b* and is thus movable between a lying position (on the port side in FIG. 1 with respect to the median plane), in which the support cylinder 130*a-b*, 132*a-b* is horizontal in order to be retracted into the chassis 102, and a raised position (on the starboard side in FIG. 1 with respect to the median plane), in which the support cylinder 130*a-b*, 132*a-b* is vertical. In the vertical position, each support 136 is oriented upwards.

In the use position, and more particularly here in the raised position, the two front support cylinders 130*a-b* are positioned on either side of the median plane and the two rear support cylinders 132*a-b* are positioned on either side of the median plane.

The transport carriage 100 has, for each support cylinder 130*a-b*, 132*a-b*, a second actuator, for example a motor or cylinder, which moves the support cylinder 130*a-b*, 132*a-b* from the lying position to the raised position and vice versa. The control unit controls each second actuator and each support cylinder 130*a-b*, 132*a-b*.

In the embodiment of the invention presented in FIG. 1, the second axis of rotation 138*a-b* is perpendicular to the median plane.

In the embodiment of the invention presented in FIG. 1, each support cylinder 130*a-b*, 132*a-b* is mounted on a beam 134 and it is this beam 134 that is rotatable on the chassis 102, but according to another embodiment, each support cylinder 130*a-b*, 132*a-b* could be mounted in a directly rotatable manner on the chassis 102.

In order to allow adjustment of each support 136 with respect to the structure of the aircraft, the support 136 is mounted on the stem of the support cylinder 130*a-b*, 132*a-b* via a second compound sliding table 140, which allows, in the raised position, the movement of the support 136 in two orthogonal and horizontal directions. The second compound sliding table 140 can be driven by a motor and is then controlled by the control unit.

The transport carriage 100 has a central support 150, which has a frame 152 and, for each wing 50, a lateral cradle 154*a-b*. Each lateral cradle 154*a-b* is intended to come to bear under the corresponding wing 50 and has a bowed shape about an axis perpendicular to the median plane. Each lateral cradle 154*a-b* is mounted on the frame 152 so as to be freely rotatable about a third axis of rotation 156 perpendicular to the median plane. The lateral cradles 154*a-b* are disposed on either side of the median plane.

Figure 3:
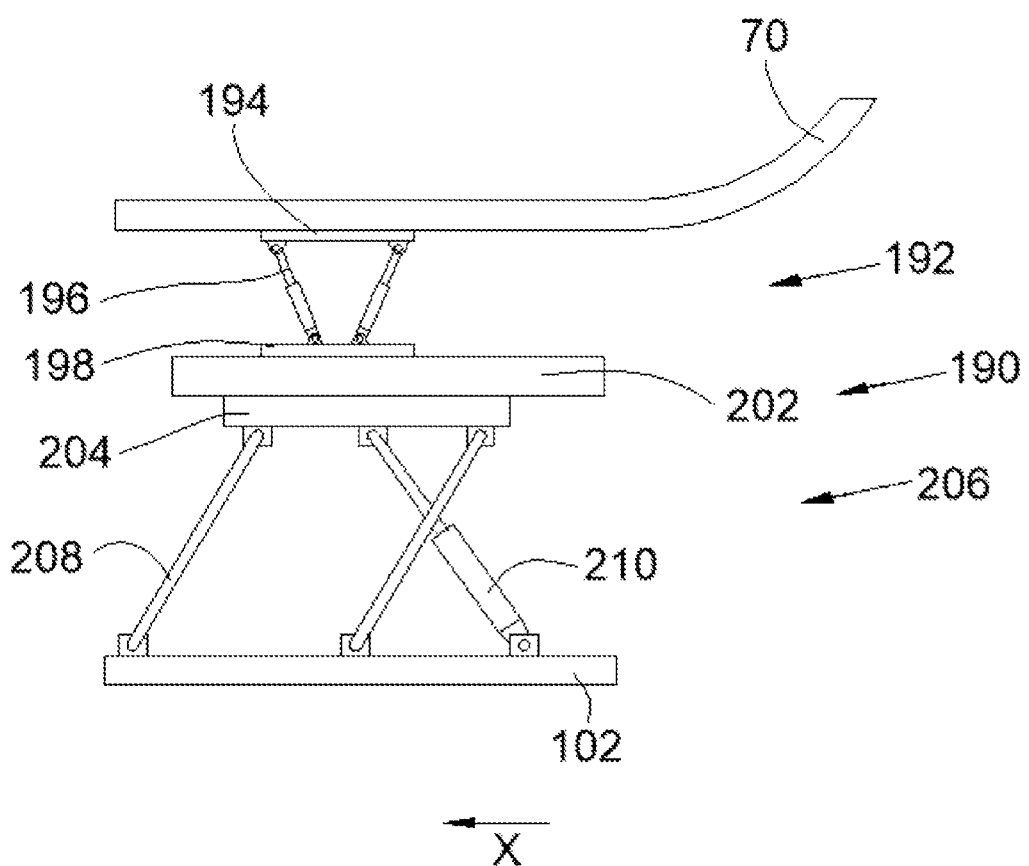
FIG. 3 is a side view of a detail of the transport carriage in FIG. 1.

FIG. 3 shows a side view of the frame 152 with the wings 50.

The frame 152 is mounted so as to be vertically movable with respect to the chassis 102 between a retracted position (FIG. 1), in which it is lowered and thus retracted into the chassis 102, and a lifted position (FIG. 3) in which it is raised such that each lateral cradle 154*a-b* comes to bear under the corresponding wing 50.

The transport carriage 100 has a third actuator, for example a motor or cylinder, which moves the frame 152 from the retracted position to the lifted position and vice versa. The control unit controls the third actuator.

As can be seen more clearly in FIG. 2, in the embodiment of the invention proposed here, the central support 150 has an additional frame 160, which is shared by the two lateral cradles 154*a-b* and which is mounted on the frame 152 so as to be rotatable about the third axis of rotation 156. Each lateral cradle 154*a-b* is made up here of two supports 162*a-b* that are aligned one behind the other along the longitudinal axis X, wherein each one is mounted on the additional frame 160 so as to be rotatable, in each case about an axis of rotation perpendicular to the median plane The transport carriage 100 has, for each wing 50, a lifting system 170*a-b*, which comprises a mast 172 and an arm 174. In order to save space, the mast 172 is mounted in this case on the chassis 102 so as to be rotatable about a fourth axis of rotation 176 between a lying position (on the port side in FIG. 1 with respect to the median plane), in which the mast 172 is horizontal in order to be retracted in the chassis 102, and a raised position (on the starboard side in FIG. 1 with respect to the median plane), in which the mast 172 is vertical.

In the use position, and more particularly here in the raised position, the two arms 174 are positioned on either side of the median plane. In the embodiment of the invention presented here, the two arms 174 extend parallel to the longitudinal axis X.

The transport carriage 100 has, for each mast 172, a fourth actuator, for example a motor or cylinder, which moves the mast 172 from the lying position to the raised position and vice versa. The control unit controls each fourth actuator.

In the embodiment of the invention presented in FIG. 1, the fourth axis of rotation 176 is parallel to the longitudinal axis X.

When the mast 172 is in the raised position, each arm 174 is movable vertically in translation on the mast 172 between a low position and a high position. In the low position, the arm 174 is spaced apart from the wing 50, and in the high position, the arm 174 has been moved towards the wing 50.

The transport carriage 100 has, for each arm 174, a fifth actuator, for example a motor or cylinder, which moves the arm 174 from the low position to the high position and vice versa. The control unit controls each fifth actuator.

Each arm 174 has at least two bearing points 178, each of which is intended to come to bear under the corresponding wing 50 during the movement of the arm 174 towards the high position. In the raised position, each bearing point 178 is oriented upwards.

In order to allow adjustment with respect to the wing 50, each bearing point 178 is mounted on the arm 174 via a third compound sliding table 180, which allows, in the high position, the movement of the bearing point 178 in two orthogonal and horizontal directions.

In order to allow vertical adjustment of each bearing point 178 in the raised position, the bearing point is vertically movable. To this end, each third compound sliding table 180 is mounted on the stem of a lifting cylinder 182 fastened to the arm 174. The control unit controls each lifting cylinder 182. When the wings 50 are fastened and before the arms 174 are lowered, the lifting cylinders 182 move the bearing points 178 away from the wings 50.

All the compound sliding tables can be moved manually, but preferably they are driven by motors and their movements are controlled by the control unit.

As is explained below, such a transport carriage 100 makes it possible to load wings 50, to transport them under the aircraft, and to raise them in order to fasten the wings 50 to the structure of the aircraft. Such a transport carriage also makes it possible to orient the wings in order to avoid the fuselage, and to carry out final adjustments during assembly.

The functioning of the transport carriage 100 will now be described.

The wings 50 rest on supporting elements, for example vertical beams.

The transport carriage 100 is positioned under the wings. To this end, the positioning cylinders 112*a-b* are placed in the lying position, the support cylinders 130*a-b*, 132*a-b* are placed in the lying position, the frame 152 is placed in the retracted position, and each mast 172 is placed in the lying position.

When the transport carriage 100 has been positioned, the frame 152 is moved into the lifted position such that the lateral cradles 154a-b come into contact with the wings 50 and lift them from the supporting elements in order to release them. The transport carriage 100 can then roll to the aircraft to which the wings 50 are intended to be fastened.

In order to save space vertically and to increase stability during rolling, each lateral cradle 154a-b, in this case via the additional frame 160, is lowered (arrow 60) by rotation about the third axis of rotation 156 and, if possible, the frame 152 is moved into the retracted position.

The transport carriage 100 and the wings 50 can then be moved under the aircraft.

Each positioning cylinder 112a-b is then placed in the raised position (arrows 62), each support cylinder 130a-b, 132a-b is placed in the raised position (arrows 64), and each mast 172 is placed in the raised position (arrows 66) with the arms 174 in the low position.

Each positioning cylinder 112a-b and each support cylinder 130a-b, 132a-b are then extended so as to bring each cradle 110a-b and each support 136 into contact with the structure of the aircraft.

The force exerted by each positioning cylinder 112a-b and each support cylinder 130a-b, 132a-b is monitored, for example by pressure sensors being placed between each cradle 110a-b and the structure, for the one part, and each support 136 and the structure, for the other part. On the basis of the data collected by the pressure sensors for monitoring these forces, the control unit adjusts the movement of each positioning cylinder 112a-b and of each support cylinder 130a-b, 132a-b. Of course, sensors of another type can be used. Throughout the different operations of mounting the wings 50, the control unit adapts the position of each positioning cylinder 112a-b and of each support cylinder 130a-b, 132a-b such that the structure of the aircraft is not deformed. Such an arrangement therefore avoids deformation of the structure during assembly.

The arms 174 are then moved vertically so as to move the two bearing points 178 towards the wings 50, the lifting cylinders 182 are then activated in order to move the bearing points 178 against the wings 50, and the continuation of the vertical movement of the arms 174 detaches the wings 50 from the lateral cradles 154a-b. As a result of a manual or automatic action on the third compound sliding tables 180 and on the lifting cylinders 182, the position of the wings 50 is adjusted with respect to the structure and the continuation of the vertical movement makes it possible to position the wings 50 at their fastening points on the structure. The movements of the third compound sliding tables 180 and of the lifting cylinders 182 can be guided by laser guidance for example.

After the wings 50 have been fastened, operations in the reverse order make it possible to disengage the transport carriage 100. In other words, the lifting cylinders 182 are lowered, and then the arms are lowered and tilted.

In some cases, it is possible for the keel beam of the structure of the aircraft to impede the placement of the wings 50. It is then necessary to remove it before the wings are raised and to refit it after the wings 50 have been fastened.

To this end, the transport carriage 100 has a handling system 190, which is shown in FIG. 3 with the keel beam 70. The handling system 190 is positioned in the median plane.

The handling system 190 has a hexapod platform 192 (also known as a Stewart platform) which has an upper platform 194, a lower platform 198 and a set of six cylinders 196, each of which is mounted in an articulated manner between the upper platform 194 and the lower platform 198. The lower platform 198 is disposed horizontally and the upper platform 194 can move depending on the position of each cylinder 196 and the control unit controls each cylinder 196.

The positioning of the cylinders 196 is conventional, that is to say, in a pyramid shape between the upper platform 194 and the lower platform 198.

The upper platform 194 has fastening means, such as threaded fasteners for example, which make it possible to fasten the keel beam 70 to the upper platform 194.

The handling system 190 has an intermediate platform 202, which is horizontal and on which the lower platform 198 is mounted so as to be movable in translation parallel to the longitudinal axis. The lower platform 198 is guided in translation by any appropriate means, for example rails, and it is set in motion by any type of appropriate actuator, for example a motor or cylinder, controlled by the control unit. The installation of a second horizontally movable platform makes it possible to increase the distance of movement.

The handling system 190 has an ascending platform 204, which is horizontal and on which the intermediate platform 202 is mounted so as to be movable in translation parallel to the longitudinal axis. The intermediate platform 202 is guided in translation by any appropriate means, for example rails, and it is set in motion by any type of appropriate actuator, for example a motor or cylinder, controlled by the control unit.

The handling system 190 has an additional lifting system 206, which makes it possible to vertically move the ascending platform 204 and therefore consequently the hexapod platform 192. The vertical movement is controlled by any type of appropriate actuator, for example a motor or cylinder, controlled by the control unit. In the embodiment of the invention presented in FIG. 3, the additional lifting system 206 has a deformable parallelogram 208 fastened between the chassis 102 and the ascending platform 204, and a cylinder 210 fastened between the chassis 102 and the ascending platform 204 and controlled by the control unit.

The withdrawal of the keel beam 70 comprises, when each cradle 110a-b and each support 136 are in contact with the structure of the aircraft, moving the ascending platform 204 via the additional lifting system 206 to move the upper platform 194 against the keel beam 70. An adjustment of the cylinders of the hexapod platform 192 allows an adjustment of the position of the upper platform 194.

The keel beam 70 is then fastened to the upper platform 194 by the fastening means and detached from the structure of the aircraft.

The ascending platform 204 is then lowered via the additional lifting system 206 so as to vertically disengage the keel beam 70.

The lower platform 198 is then moved horizontally towards the rear in order to horizontally disengage the keel beam 70 a first time.

The intermediate platform 202 is then moved horizontally towards the rear in order to horizontally disengage the keel beam 70 a second time.

Once the wings 50 have been fastened, operations in the reverse order make it possible to refit the keel beam 70.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A transport carriage for wings of an aircraft, having a structure where the wings are secured together, the transport carriage comprising:
   a chassis mounted on pivotable wheels,
   a front cradle and a rear cradle that are configured to come to bear under the structure of the aircraft,
      for each cradle, a positioning cylinder, wherein the cradle is mounted on the positioning cylinder, wherein each cradle is positioned in a centered manner with respect to the chassis,
   two front support cylinders and two rear support cylinders, each of which has a support that is mounted on the support cylinder and is configured to come to bear under the structure of the aircraft, wherein the two front support cylinders are positioned on either side of a center of the chassis and the two rear support cylinders are positioned on either side of the center of the chassis,
   a central support having a frame and, for each wing, a lateral cradle configured to come to bear under the wing, wherein each lateral cradle is mounted on the frame to be freely rotatable about a cradle axis of rotation perpendicular to a longitudinal direction of the transport carriage, wherein the frame is mounted to be vertically movable with respect to the chassis between a retracted position and a lifted position,
   the frame actuated from the retracted position to the lifted position and vice versa,
   for each wing, a lifting system that comprises a mast and an arm, wherein the two arms are positioned on either side of the center of the chassis, wherein each arm is movable vertically in translation on the mast between a low position and a high position,
      each arm actuated from the low position to the high position and vice versa,
      for each arm, at least two bearing points, each of which is intended to come to bear under the corresponding wing during a movement of the arm to the high position, and
   a control unit configured to control each positioning cylinder, each support cylinder, the frame, and each arm.

2. The transport carriage according to claim 1, wherein each positioning cylinder is mounted on the chassis to be rotatable about a first axis of rotation and to be movable between a lying position and a raised position, wherein, in the raised position, each cradle is positioned in a centered manner with respect to the center of the chassis, and wherein, for each positioning cylinder, wherein the control unit controls actuation of said positioning cylinder from the lying position to the raised position and vice versa.

3. The transport carriage according to claim 1, wherein each support cylinder is mounted on the chassis to be rotatable about a support cylinder axis of rotation and is movable between a lying position and a raised position, wherein, in the raised position, the two front support cylinders are positioned on either side of the center of the chassis and the two rear support cylinders are positioned on either side of the center of the chassis, and wherein, for each support cylinder, wherein the control unit controls actuation of said support cylinder from the lying position to the raised position and vice versa.

4. The transport carriage according to claim 1,
   wherein each mast is mounted on the chassis to be rotatable about a mast axis of rotation between a lying position and a raised position,
   wherein, in the raised position, the two arms are positioned on either side of the center of the chassis,
   wherein, when the mast is in the raised position, each arm is movable vertically in translation on the mast between the low position and the high position, and
   wherein, for each mast, wherein the control unit controls actuation of said mast from the lying position to the raised position and vice versa.

5. The transport carriage according to claim 1, wherein each bearing point is mounted on the arm via a third compound sliding table, which allows, in the high position, the bearing point to be moved in two orthogonal and horizontal directions.

6. The transport carriage according to claim 5, wherein each third compound sliding table is mounted on a lifting cylinder that is fastened to the arm and controlled by the control unit.

7. The transport carriage according to claim 1, wherein each cradle is mounted on the positioning cylinder via a first compound sliding table, which allows the cradle to be moved in two orthogonal and horizontal directions.

8. The transport carriage according to claim 1, wherein the support is mounted on the support cylinder via a second compound sliding table, which allows the support to be moved in two orthogonal and horizontal directions.

9. The transport carriage according to claim 1, wherein the central support has an additional frame, which is shared by the two lateral cradles and which is mounted on the frame to be rotatable about the cradle axis of rotation, and wherein each lateral cradle is mounted on the additional frame to be rotatable.

* * * * *